(12) United States Patent
Sato et al.

(10) Patent No.: US 12,725,737 B2
(45) Date of Patent: Sep. 1, 2026

(54) ELECTRONIC COMPONENT

(71) Applicant: TDK Corporation, Tokyo (JP)

(72) Inventors: Takaaki Sato, Tokyo (JP); Akihiro Masuda, Tokyo (JP); Norihisa Ando, Tokyo (JP); Shinya Ito, Yurihonjo-city (JP); Masahiro Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 197 days.

(21) Appl. No.: 18/829,466

(22) Filed: Sep. 10, 2024

(65) Prior Publication Data

US 2025/0157735 A1 May 15, 2025

(30) Foreign Application Priority Data

Nov. 13, 2023 (JP) ................................ 2023-193131

(51) Int. Cl.
*H01G 4/224* (2006.01)
*H01G 4/12* (2006.01)

(52) U.S. Cl.
CPC ............... *H01G 4/224* (2013.01); *H01G 4/12* (2013.01)

(58) Field of Classification Search
CPC ............. H01G 4/30; H01G 4/224; H01G 4/12
USPC ..................... 361/301.1, 301.3, 301.4, 321.1
See application file for complete search history.

(56) References Cited

FOREIGN PATENT DOCUMENTS

JP H08339942 A * 12/1996
JP 2001-274037 A 10/2001

* cited by examiner

*Primary Examiner* — Arun Ramaswamy
(74) *Attorney, Agent, or Firm* — Oliff PLC

(57) ABSTRACT

An electronic component includes: a ceramic body having principal surfaces; electrode parts respectively provided on the principal surfaces; lead terminals electrically connected to the respective electrode parts; and an exterior resin provided so as to cover the ceramic body, the electrode parts, and base end portions of the lead terminals, in which the exterior resin has a two-layer structure including an inner layer and an outer layer having colors different from each other, and the color of the inner layer is a color having a color difference of within 150 from a separation color having the largest color difference with respect to the color of the outer layer in an L*a*b* color space S each having a value of 0 to 255.

6 Claims, 11 Drawing Sheets

| EXAMPLE 1 | | | | |
|---|---|---|---|---|
| COLOR COORDINATE OF OUTER LAYER | LIGHT BLUE [200, 117, 115] | | | |
| COLOR COORDINATE OF SEPARATION COLOR | BROWN [0, 255, 255] | | | |
| COLOR COORDINATE OF INNER LAYER | BROWN [0, 255, 255] | REDDISH BROWN [58, 197, 197] | DARK BROWN [87, 168, 168] | GRAY [115, 140, 140] |
| COLOR DIFFERENCE | 0 | 100 | 150 | 200 |
| AUC | 1.00 | 1.00 | 1.00 | 0.79 |

| EXAMPLE 2 | | | | |
|---|---|---|---|---|
| COLOR COORDINATE OF OUTER LAYER | DARK BLUE [92, 167, 52] | | | |
| COLOR COORDINATE OF SEPARATION COLOR | BRIGHT GREEN [255, 0, 255] | | | |
| COLOR COORDINATE OF INNER LAYER | BRIGHT GREEN [255, 0, 255] | GREEN [197, 58, 197] | DEEP GREEN [168, 87, 168] | GRAY [140, 115, 140] |
| COLOR DIFFERENCE | 0 | 100 | 150 | 200 |
| AUC | 1.00 | 1.00 | 1.00 | 0.31 |

ELECTRONIC COMPONENT

CROSS-REFERENCE TO RELATED APPLICATIONS

This application is based upon and claims the benefit of priority from Japanese Patent Application No. 2023-193131, filed on Nov. 13, 2023, the entire contents of which are incorporated herein by reference.

TECHNICAL FIELD

The present disclosure relates to an electronic component such as a capacitor.

BACKGROUND

As a conventional electronic component, for example, there is a ceramic electronic component described in Japanese Unexamined Patent Publication No. 2001-274037. This conventional electronic component includes a ceramic body, an external electrode provided on the ceramic body, a lead terminal connected to the external electrode, and an exterior resin covering the ceramic body and the external electrode.

SUMMARY

In the electronic component as described above, a thin hole (hereinafter referred to as a "pinhole") may be formed in the exterior resin in the manufacturing process. There are many unclear parts in the mechanism of formation of pinholes, and it is difficult to suppress formation of pinholes at present. For this reason, an appearance inspection is performed on the manufactured electronic component, and a non-defective product and a defective product are determined on the basis of the formation state of the pinhole in the exterior resin. In the appearance inspection, for example, a product in which the pinhole cannot be confirmed is determined to be a non-defective product, and a product in which the depth of the pinhole can be confirmed is determined to be a non-defective product within the limit, but a product in which the depth of the pinhole cannot be confirmed is determined to be a defective product from the viewpoint of securing the reliability of the electronic component.

For the appearance inspection of the electronic component, for example, an AI image inspection using a non-defective product model is used. In this method, for example, by learning only non-defective product data, a non-defective product model in which the threshold of the non-defective product is optimized is generated and used for quality determination of the appearance inspection. However, in this method, since the sum of the color differences between the input image and the output image is set as an abnormality degree, it tends to be difficult to obtain sufficient determination accuracy for an abnormality with a small area or an abnormality with a small color difference from the non-defective product image. Since the pinhole in the electronic component corresponds to both the abnormality with a small area and the abnormality with a small color difference from the non-defective product image, a technique capable of improving the inspection accuracy is desired.

The present disclosure has been made to solve the above problems, and an object of the present disclosure is to provide an electronic component in which quality determination based on a pinhole formation state can be accurately performed.

The gist of the present disclosure is as follows.

[1] An electronic component including: a ceramic body having a pair of principal surfaces; a pair of electrode parts respectively provided on the pair of principal surfaces; a pair of lead terminals electrically connected to the pair of electrode parts, respectively; and an exterior resin provided so as to cover the ceramic body, the pair of electrode parts, and base end portions of the pair of lead terminals, in which the exterior resin has a two-layer structure including an inner layer and an outer layer having colors different from each other, and the color of the inner layer is a color having a color difference of within 150 from a separation color having a largest color difference with respect to the color of the outer layer in an L*a*b* color space each having a value of 0 to 255.

In this electronic component, the exterior resin includes the inner layer and the outer layer, and the color of the inner layer is defined on the basis of the separation color farthest from the color of the outer layer in the L*a*b* color space. In this electronic component, since there is a sufficient color difference between the outer layer and the inner layer, the formation state of a pinhole can be confirmed by counting the color away from the color of the outer layer in the image processing. At this time, when the color difference of the color of the inner layer with respect to the separation color is within 150, an AUC, which is an evaluation index related to binary classification, can be brought close to 1. Therefore, in this electronic component, the quality determination based on the formation state of the pinhole can be accurately performed.

[2] The electronic component according to [1], in which the color of the inner layer is a color having a color difference of within 100 from the separation color. In this case, the AUC, which is an evaluation index related to the binary classification, can be brought closer to 1 more reliably. Therefore, the quality determination based on the formation state of the pinhole can be performed more accurately.

[3] The electronic component according to [1] or [2], in which the color of the outer layer is a color having a color difference of within 50 from a vertex color located at a vertex of the L*a*b* color space. In this case, the color difference between the color of the outer layer and the separation color can be sufficiently secured, and as a result, the color difference between the outer layer and the inner layer can be easily secured. Therefore, the accuracy of the quality determination based on the formation state of the pinhole can be further improved. Furthermore, the degree of freedom in selecting the resin material used for the inner layer can be secured.

[4] The electronic component according to any one of [1] to [3], in which the color of the outer layer is a color having a color difference of within 50 from a side color located at a side portion of the L*a*b* color space. In this case, the color difference between the color of the outer layer and the separation color can be sufficiently secured, and as a result, the color difference between the outer layer and the inner layer can be easily secured. Therefore, the accuracy of the quality determination based on the formation state of the pinhole can be further improved. Furthermore, the degree of freedom in selecting the resin material used for the inner layer can be secured.

[5] The electronic component according to any one of [1] to [4], in which in the exterior resin, a thickness of the inner layer is larger than a thickness of the outer layer at least in a portion closer to the pair of lead terminals than the ceramic body. In the exterior resin, the pinhole tends to be more likely to occur in the portion closer to the pair of lead terminals than the ceramic body. By making the thickness of the inner layer of the portion larger than the thickness of the outer layer, the inner layer is easily exposed from the outer layer in the pinhole having a depth reaching the lead terminal, and the accuracy of the quality determination can be secured.

[6] The electronic component according to any one of [1] to [4], in which in the exterior resin, a thickness of the outer layer is larger than a thickness of the inner layer at least in a portion closer to the pair of lead terminals than the ceramic body. In the exterior resin, the pinhole tends to be more likely to occur in the portion closer to the pair of lead terminals than the ceramic body. By making the thickness of the outer layer of the portion larger than the thickness of the inner layer, in the pinhole having a depth that does not reach the lead terminals or the ceramic body, the inner layer is less likely to be exposed from the outer layer, so that it is possible to suppress the determination that a non-defective product within the limit is a defective product.

DETAILED DESCRIPTION

Hereinafter, a preferred embodiment of an electronic component according to one aspect of the present disclosure will be described in detail with reference to the drawings.

Figure 1:
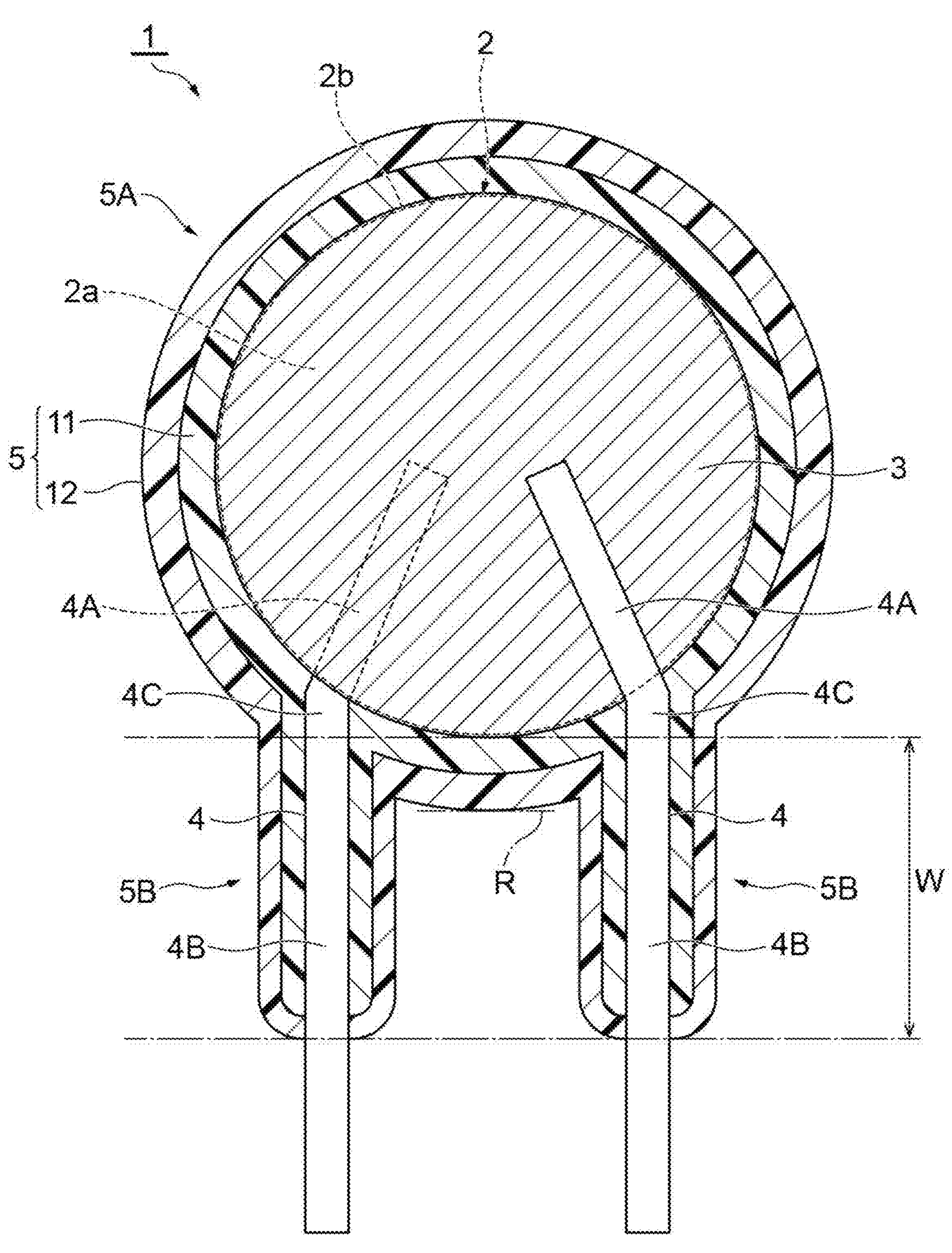
FIG. 1 is a schematic cross-sectional view of an electronic component according to an embodiment of the present disclosure as viewed from the front.
Figure 2:
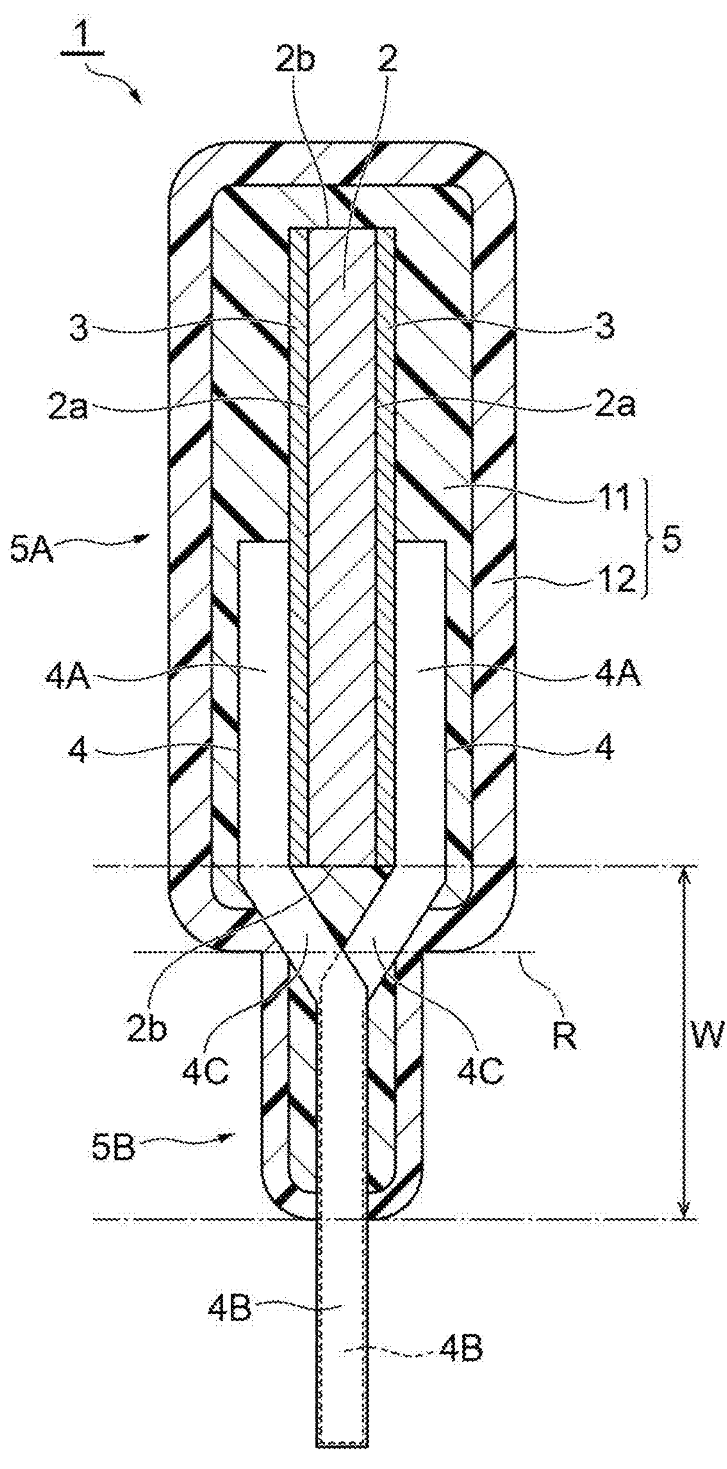
FIG. 2 is a schematic cross-sectional view of the electronic component illustrated in FIG. 1 as viewed from a side surface.

FIG. 1 is a schematic cross-sectional view of an electronic component according to an embodiment of the present disclosure as viewed from the front. Furthermore, FIG. 2 is a schematic cross-sectional view of the electronic component illustrated in FIG. 1 as viewed from a side surface. An electronic component 1 illustrated in FIGS. 1 and 2 is configured as a single-plate capacitor of a radial lead type. The electronic component 1 is mounted on a substrate of an electronic device using a joining material such as solder. The electronic component 1 includes a ceramic body 2, a pair of electrode parts 3 and 3, a pair of lead terminals 4 and 4, and an exterior resin 5. In a disk-shaped portion 5A of the exterior resin 5 described later, a surface in a direction in which the lead terminal 4 extends is a mounting surface R at the time of mounting on the substrate.

In the following description, for convenience of description, the mounting surface R is referred to as a lower side, and a surface opposite to the mounting surface R is referred to as an upper side. Furthermore, a normal direction of the mounting surface R is defined as a height direction, an opposing direction of principal surfaces 2_a_ and 2_a_ in the ceramic body 2 is defined as a thickness direction, and a direction orthogonal to the normal direction of the mounting surface R and the opposing direction of the principal surfaces 2_a_ and 2_a_ is defined as a width direction. The electronic component 1 is configured to have left-right symmetry when viewed from each of the normal direction, the thickness direction, and the width direction of the mounting surface R.

The ceramic body 2 includes, for example, a dielectric element. The dielectric element includes, for example, a sintered body of a ceramic green sheet containing a dielectric material (dielectric ceramic such as $BaTiO_3$ based, $Ba(Ti, Zr)O_3$ based, or $(Ba, Ca)TiO_3$ based).

The entire shape of the ceramic body 2 is a disk shape or a flat columnar shape. The ceramic body 2 has a pair of the circular principal surfaces 2_a_ and 2_a_ facing each other, and a peripheral surface 2_b_ connecting the principal surfaces 2_a_ and 2_a_. The ceramic body 2 is disposed such that the opposing direction of the principal surfaces 2_a_ and 2_a_ intersects (is orthogonal to) the normal direction of the mounting surface R.

The electrode parts 3 and 3 are provided on the principal surfaces 2_a_ and 2_a_, respectively. The electrode part 3 is provided so as to cover the entire principal surface 2_a_, for example. One of the electrode parts 3 and 3 is a positive electrode, and the other is a negative electrode. The electrode part 3 includes a sintered layer of an electrode paste containing metal or glass. As the metal, for example, Cu, Ni, Ag, or the like can be used.

The lead terminals 4 and 4 are electrically connected to the electrode parts 3 and 3, respectively. The lead terminal 4 connected to the positive electrode is a positive terminal, and the lead terminal 4 connected to the negative electrode is a negative terminal. A joining material such as solder can be used for connecting the lead terminal 4 and the electrode part 3, for example. Examples of a constituent material of the lead terminal 4 include phosphor bronze, stainless steel, and a Ni—Fe alloy (for example, 42 alloy). A metal plating layer such as a Ni plating layer or a Sn plating layer may be provided on the surface of the lead terminal 4. The plating layer may be either a single layer or a multilayer.

The lead terminal 4 has a connection portion 4A connected to the electrode part 3 on the principal surface 2*a* of the ceramic body 2, and a hanging portion 4B continuously protruding from the connection portion 4A toward the mounting surface R. As illustrated in FIG. 1, the connection portion 4A of the one lead terminal 4 extends in the in-plane direction of the electrode part 3 from the vicinity of the center of the ceramic body 2 toward one outer side in the width direction when viewed from the opposing direction of the principal surfaces 2*a* and 2*a*. The connection portion 4A of the other lead terminal 4 extends in the in-plane direction of the electrode part 3 from the vicinity of the center of the ceramic body 2 toward the other outer side in the width direction when viewed from the opposing direction of the principal surfaces 2*a* and 2*a*. The hanging portion 4B linearly extends from the distal end of the connection portion 4A along the normal direction of the mounting surface R when viewed from the opposing direction of the principal surfaces 2*a* and 2*a*.

As illustrated in FIG. 2, the intermediate portion of the hanging portion 4B is provided with a kink portion 4C subjected to a kink process. The kink process is a bending process performed for the purpose of facilitating temporary fixing of the electronic component 1 to the substrate. With the kink portion 4C, the hanging portion 4B is bent toward the center side in the thickness direction at a position below the ceramic body 2. When the electronic component 1 is viewed from the width direction, the positions in the thickness direction of the hanging portions 4B and 4B of the lead terminals 4 and 4 are aligned with each other, the hanging portions 4B and 4B being closer to the distal end side than the kink portion 4C.

The exterior resin 5 is a member that protects a main part of the ceramic body 2 and the like. The exterior resin 5 is provided so as to cover the base end portions of the ceramic body 2 and the lead terminals 4 and 4. In the present embodiment, the exterior resin 5 covers the respective base end portions of the lead terminals 4 and 4 so as to include the kink portion 4C. That is, in the present embodiment, the kink portion 4C is located between the ceramic body 2 and the mounting surface R in the height direction of the electronic component 1, and is buried in the exterior resin 5.

The exterior resin 5 is made of, for example, an insulating resin material. The exterior resin 5 is formed by, for example, a dipping method or injection molding using a mold. The exterior resin 5 is schematically shaped in accordance with the shapes of the ceramic body 2, the electrode parts 3 and 3, and the lead terminals 4 and 4. The exterior resin 5 has the disk-shaped portion 5A that covers the ceramic body 2 and the electrode parts 3 and 3, and a pair of protruding portions 5B and 5B that protrudes downward from the disk-shaped portion 5A and covers the respective base end portions of the lead terminals 4 and 4.

The exterior resin 5 has a two-layer structure including an inner layer 11 and an outer layer 12 having different colors. The inner layer 11 integrally covers the ceramic body 2, the electrode parts 3 and 3, and the lead terminals 4 and 4. The outer layer 12 is formed so as to cover the entire inner layer 11, and integrally covers the ceramic body 2, the electrode parts 3 and 3, and the lead terminals 4 and 4 together with the inner layer 11. Examples of the resin material constituting the inner layer 11 include epoxy resin and silica, and the like. Examples of the resin material constituting the outer layer 12 include epoxy resin, silica, and the like, similarly to the inner layer 11. In the examples of FIGS. 1 and 2, the thickness of the inner layer 11 and the thickness of the outer layer 12 are uniform and equal to each other regardless of the site.

The inner layer 11 and the outer layer 12 have different colors from each other from the viewpoint of accurately detecting a pinhole P (see FIGS. 10A and 11B) in the exterior resin 5 by image processing. The color of the inner layer 11 and the color of the outer layer 12 can be represented using an L*a*b* color space. The L*a*b* color space is a complementary color space represented by an L"axis indicating brightness and an a axis and a b*axis indicating chromaticity. The L*a*b* color space is standardized by the International Commission on Illumination (CIE), and is adopted in Japan by JIS (JIS Z 8781-4).

Figure 3:
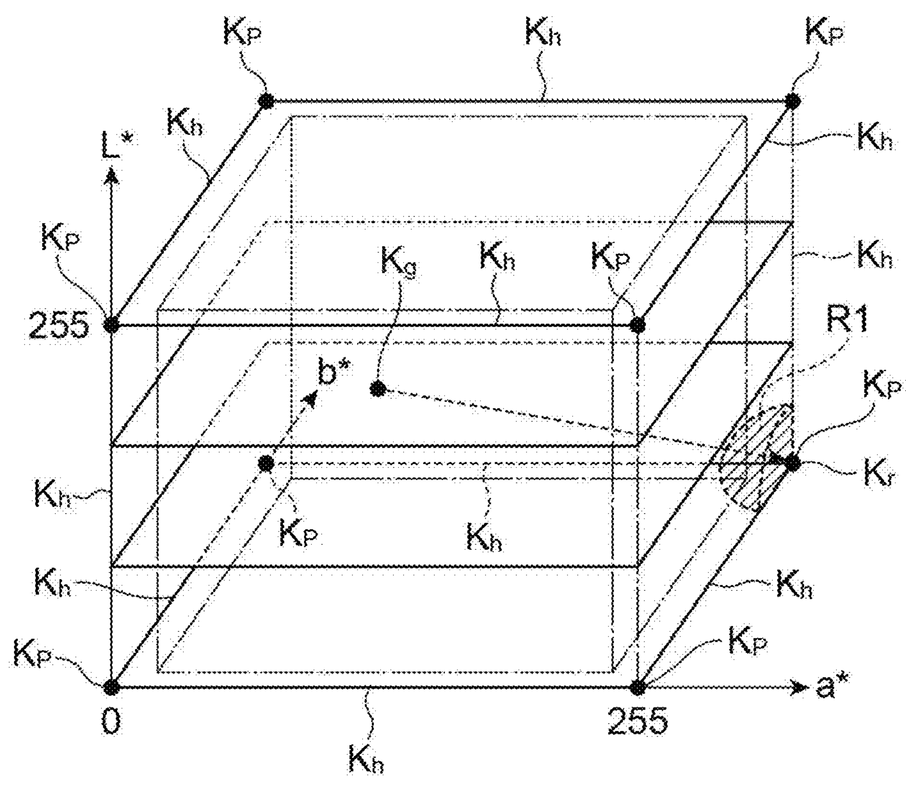
FIG. 3 is a view illustrating a relationship between a color of an outer layer and a color of an inner layer in an L*a*b* color space.

An L*a*b* color space S illustrated in FIG. 3 is a three-dimensional orthogonal space in which L*, a*, and b* each have a value of 0 to 255. The smaller the value of L*is, the darker the color is, and the larger the value of L* is, the lighter the color is. The closer the values of a and b are to the edge of the L*a*b* color space S, the more vivid the color becomes, and the closer the values of a and b*are to the center of the L*a*b* color space S, the duller the color becomes. A difference (color difference) ΔE between two colors in the L*a*b* color space S is represented by a distance between two points in the space as shown in the following Formula (1).

[Math. 1]

$$\Delta E^*=\sqrt{\Delta L^{*2}+\Delta a^{*2}+\Delta b^{*2}} \quad (1)$$

In the present embodiment, the color of the inner layer 11 is a color in which the color difference from the separation color having the largest color difference with respect to the color of the outer layer 12 in the L*a*b* color space S is within 150, preferably within 100. For example, as illustrated in FIG. 3, in a case where the L*a*b* coordinate of the point Kg indicating the color of the outer layer 12 is [200, 117, 115], the L*a*b* coordinate of the point Kr indicating the separation color having the largest color difference with respect to the color of the outer layer 12 is [0, 255, 255] (the color difference between the point Kg and the point Kr is estimated to be about 280 from Formula (1)). In this case, the color of the inner layer 11 is selected from the colors located in a region R1 in which the color difference from the point Kr indicating the separation color is within 150, preferably within 100.

In selecting the color of the inner layer 11, the color of the outer layer 12 may be selected from colors in which the color difference from the color (vertex color) located at a vertex Kp of the L*a*b* color space S is within 50. Furthermore, the color of the outer layer 12 may be selected from colors having a color difference within 50 from colors (side colors) located at a side portion Kh of the L*a*b* color space S. In the present embodiment, the color of the outer layer 12 is selected from the colors located in a region R2 in which the color difference from the vertex color is within 50 or the color difference from the side color is within 50.

Figure 4:
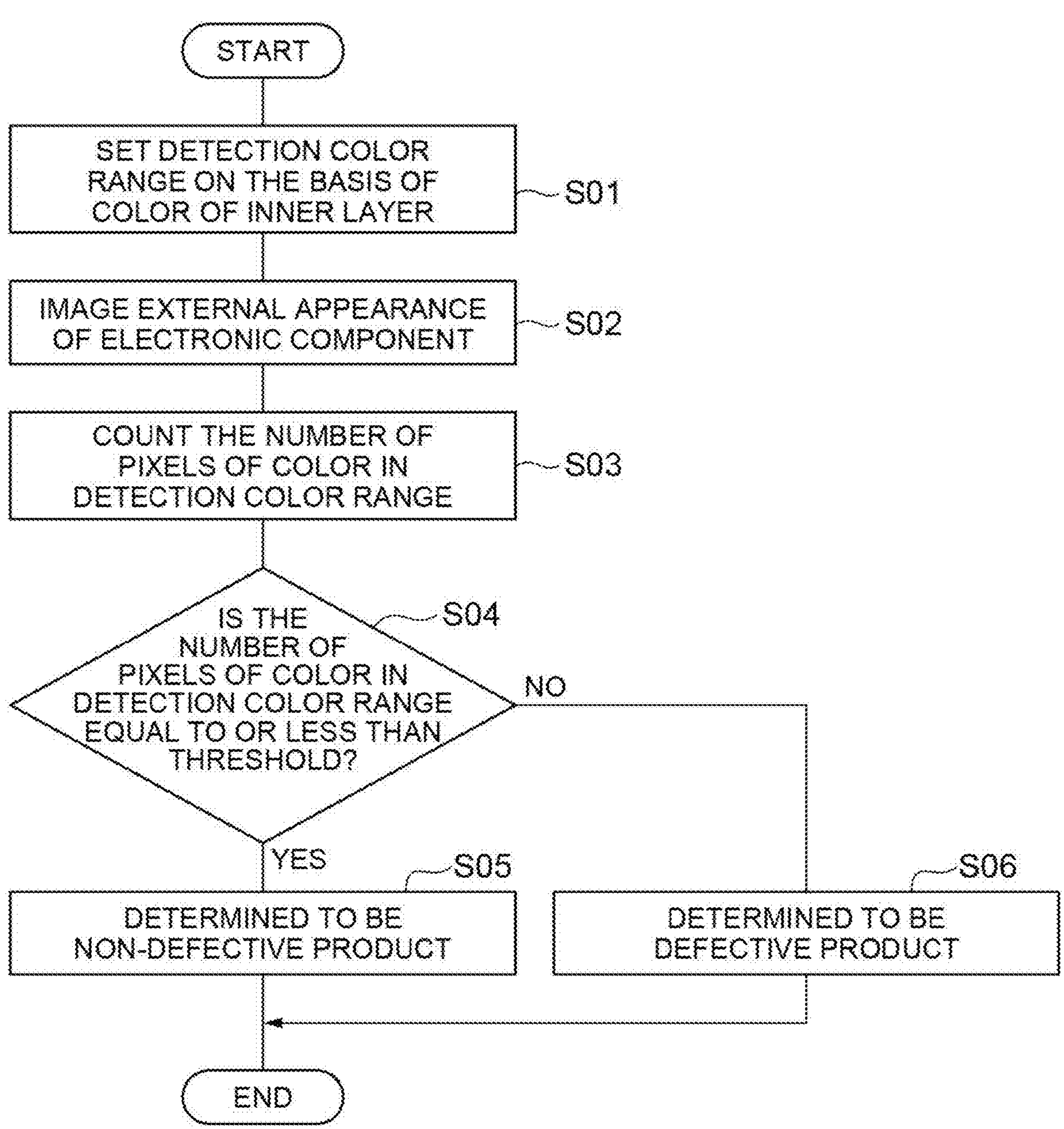
FIG. 4 is a flowchart illustrating an example of an appearance inspection for the electronic component illustrated in FIGS. 1 and 2.

FIG. 4 is a flowchart illustrating an example of an appearance inspection of an electronic component. As illustrated in FIG. 4, in a case where the appearance inspection of the electronic component 1 is performed, first, a detection color range in the image processing is set on the basis of the color of the inner layer 11 (step S01). The detection color range is set, for example, in a range including the color of the inner layer 11. In the present embodiment, since the color of the inner layer 11 is set in the region R1 in which the color difference from the point Kr indicating the separation color is within 150, preferably within 100, for example, the region R1 is set as the detection color range.

After the detection color range is set, the external appearance of the electronic component 1 is imaged using an imaging device such as a camera (step S02). Here, the front and back surfaces (both surfaces in the thickness direction) of the electronic component 1 are imaged, and image data based on the imaging result is acquired. In a case where the appearance inspection is performed on a plurality of the electronic components 1, imaging may be performed while the plurality of electronic components 1 are conveyed by conveyance means such as a conveyor.

Next, the number of pixels of colors within the detection color range among the pixels included in the acquired image data of the front and back surfaces of the electronic component 1 is counted (step S03). In counting the number of pixels, for example, the color of each pixel included in the image data of the front and back surfaces of the electronic component 1 is converted into coordinates in the L*a*b* color space by using OpenCV (Open Source Computer Vision Library) of Python. Then, the total number of pixels of colors within the detection color range in the acquired image data of the front and back surfaces of the electronic component 1 is counted.

Subsequently, it is determined whether the number of pixels of the color in the detection color range is equal to or less than the threshold (step S04). As described above, the color within the detection color range is set to the color of the inner layer 11 and the color in the vicinity thereof. In a case where the pinhole P is not formed in the exterior resin 5, only the outer layer 12 is exposed on the surface of the electronic component 1, so that the image data of the electronic component 1 does not include pixels of colors within the detection color range. On the other hand, in a case where the pinhole P is formed in the exterior resin 5, the inner layer 11 is exposed at the position of the pinhole P. Therefore, whether or not the pinhole P is formed in the exterior resin 5 can be determined on the basis of the number of pixels of the color in the detection color range.

In a case where the number of pixels of the color in the detection color range is equal to or less than the threshold in step S04, the electronic component 1 is determined to be a non-defective product (step S05). In a case where the number of pixels of the color in the detection color range exceeds the threshold, the electronic component 1 is determined to be a defective product (step S06). In step S05, a further threshold for determining a non-defective product and a non-defective product within the limit may be provided. In this case, for example, the determination can be made such that the electronic component 1 is determined to be a non-defective product when the number of pixels of the color in the detection color range is zero, the electronic component 1 is determined to be a non-defective product within the limit when the number of pixels is one or more and four or less, and the electronic component 1 is determined to be a defective product when the number of pixels is five or more.

Note that the appearance inspection illustrated in FIG. 4 and the AI image inspection using the non-defective product model may be combined. In the AI image inspection, for example, a non-defective product model in which a threshold for a non-defective product is optimized is generated by learning only non-defective product data, and the quality determination is performed using the sum of the color differences between the input image and the output image as the abnormality degree. In a case where the appearance inspection illustrated in FIG. 4 and the AI image inspection is combined, the AI image inspection may be performed first, and the appearance inspection illustrated in FIG. 4 may be performed on the electronic component 1 determined to be a non-defective product. Conversely, the appearance inspection illustrated in FIG. 4 may be performed first, and the AI image inspection may be performed on the electronic component 1 determined to be a non-defective product.

Subsequently, an evaluation test of the determination will be described in a case where the appearance inspection illustrated in FIG. 4 is performed on the electronic component 1.

In this evaluation test, 20 non-defective product images were prepared for the electronic components of Example 1 and Example 2, 10 images out of the 20 images were used as non-defective product images as they were, and the remaining 10 images were used as defective product images on which dummy pinhole images having a color with L*a*b* coordinates of [0, 255, 255] (corresponding to the above-described separation color) were superimposed. Then, using the color of [0, 255, 255] as a reference, an area under ROC curve (AUC) was calculated with the number of pixels having a color difference from the color equal to or less than the threshold as an abnormality degree.

The AUC is an evaluation index related to binary classification such as quality determination, and has a value in a range of 0 to 1. In a case where the quality can be completely classified, the value of the AUC is 1, and in a case where the quality classification is random, the value of AUC is 0.5. The AUC is a value determined on the basis of a receiver operating characteristics (ROC) curve, and is specifically represented by the area of a portion below the ROC curve.

Figure 5A:
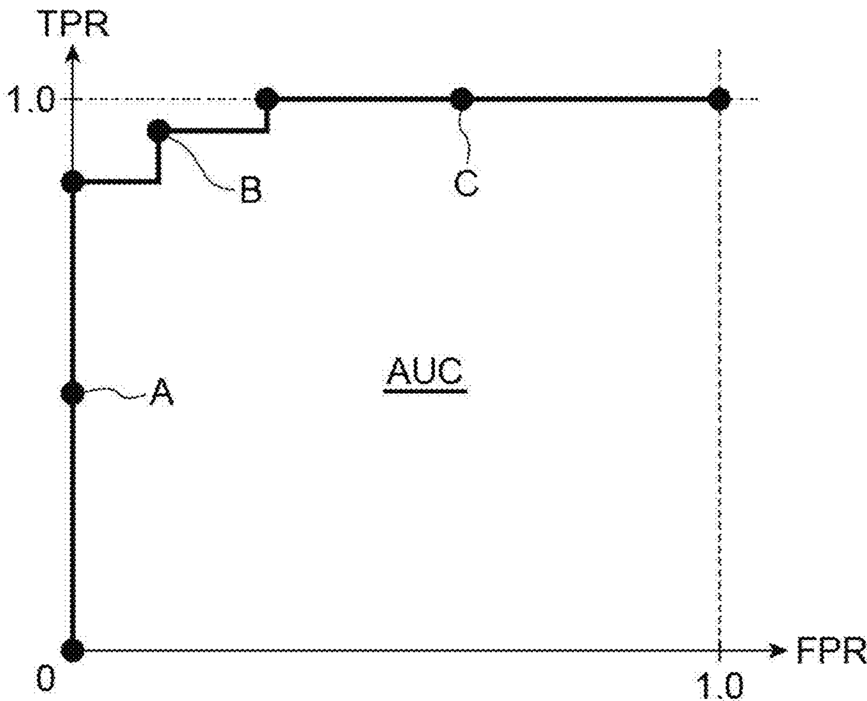
FIG. 5A is a diagram showing a relationship between an ROC curve and an AUC.
Figure 5B:
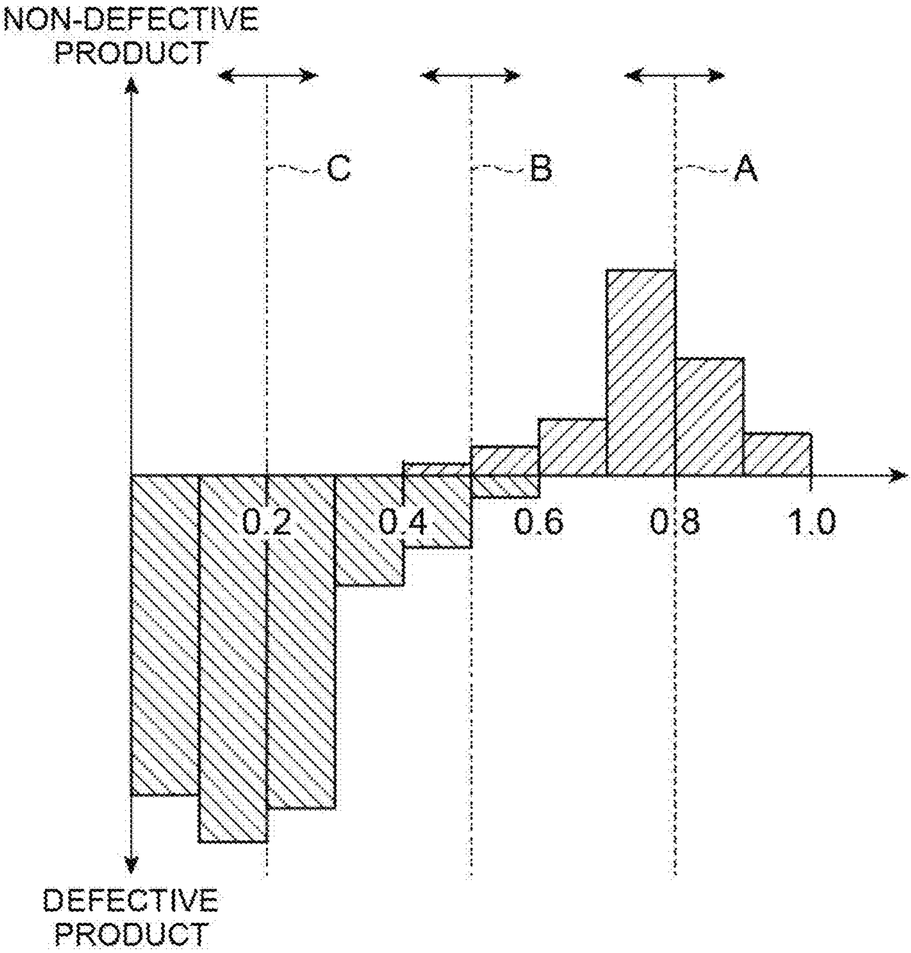
FIG. 5B is a diagram showing a relationship between an ROC curve and an AUC.

The ROC curve is represented by a two-dimensional plane in which the horizontal axis represents a false positive rate (FPR) and the vertical axis represents a true positive rate (TPR). The false positive rate is a rate at which a product is correctly determined to be a non-defective product with respect to the total number of non-defective products. The true positive rate is a rate at which a product is erroneously determined to be a non-defective product with respect to all defective products. FIG. 5A is a diagram illustrating an example of a distribution of non-defective products and defective products. As illustrated in FIG. 5A, as the threshold of the quality determination is changed, the true positive rate and the false positive rate change. FIG. 5B is a diagram illustrating a tendency of the ROC curve in general binary classification. The true positive rate and the false positive rate at each of a threshold A, a threshold B, and a threshold C illustrated in FIG. 5A correspond to, for example, a point A, a point B, and a point C of the ROC curve illustrated in FIG. 5B, respectively.

Figure 6A:
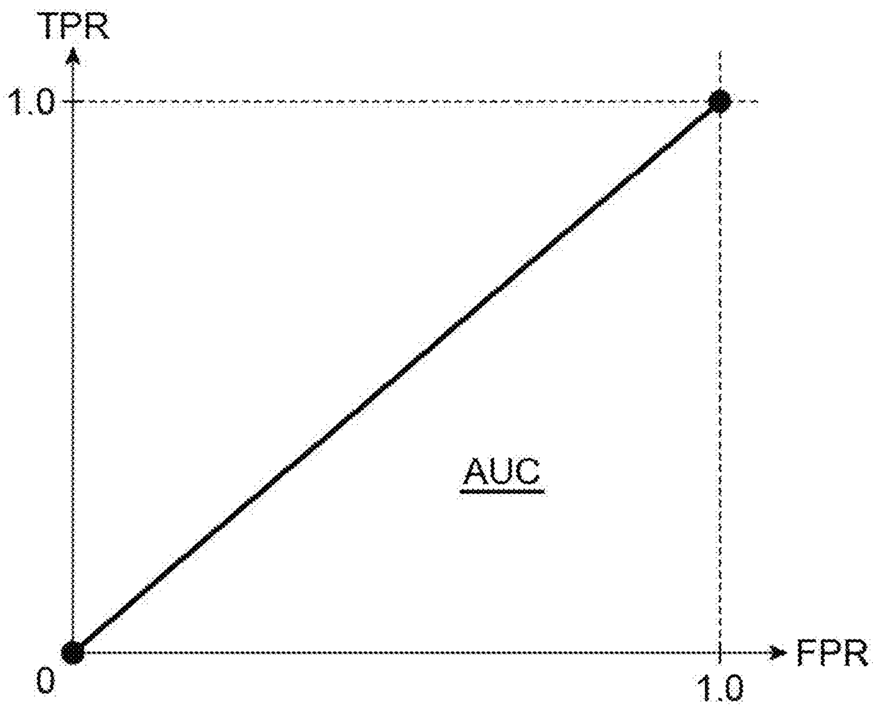
FIG. 6A is a diagram showing a relationship between an ROC curve and an AUC.
Figure 6B:
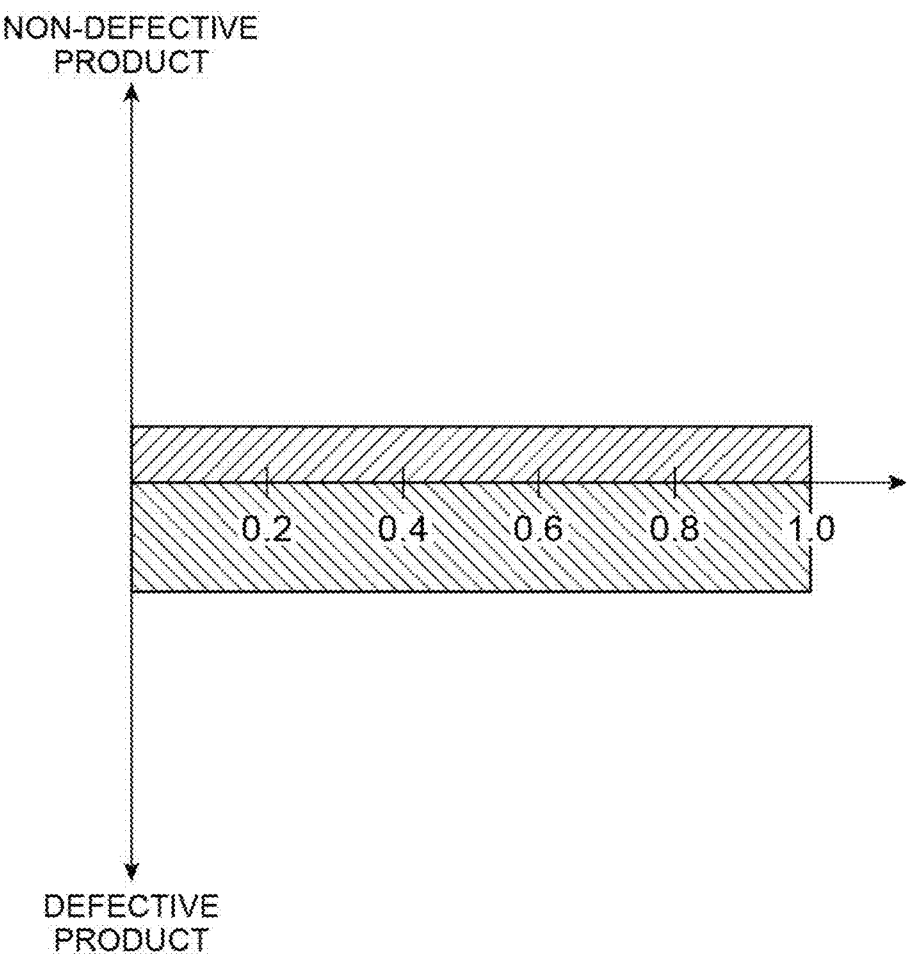
FIG. 6B is a diagram showing a relationship between an ROC curve and an AUC.
Figure 7A:
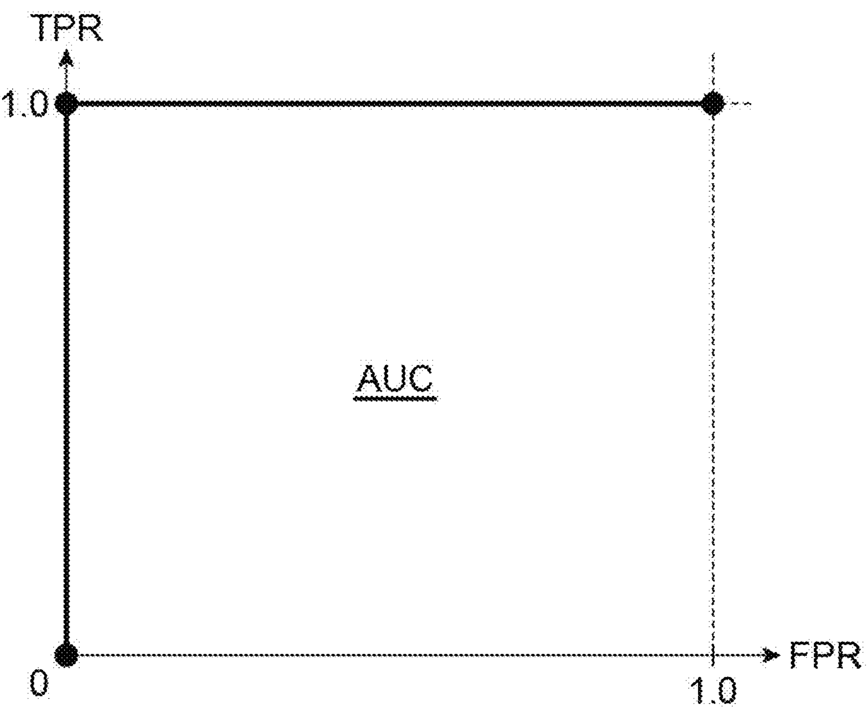
FIG. 7A is a diagram showing a relationship between an ROC curve and an AUC.
Figure 7B:
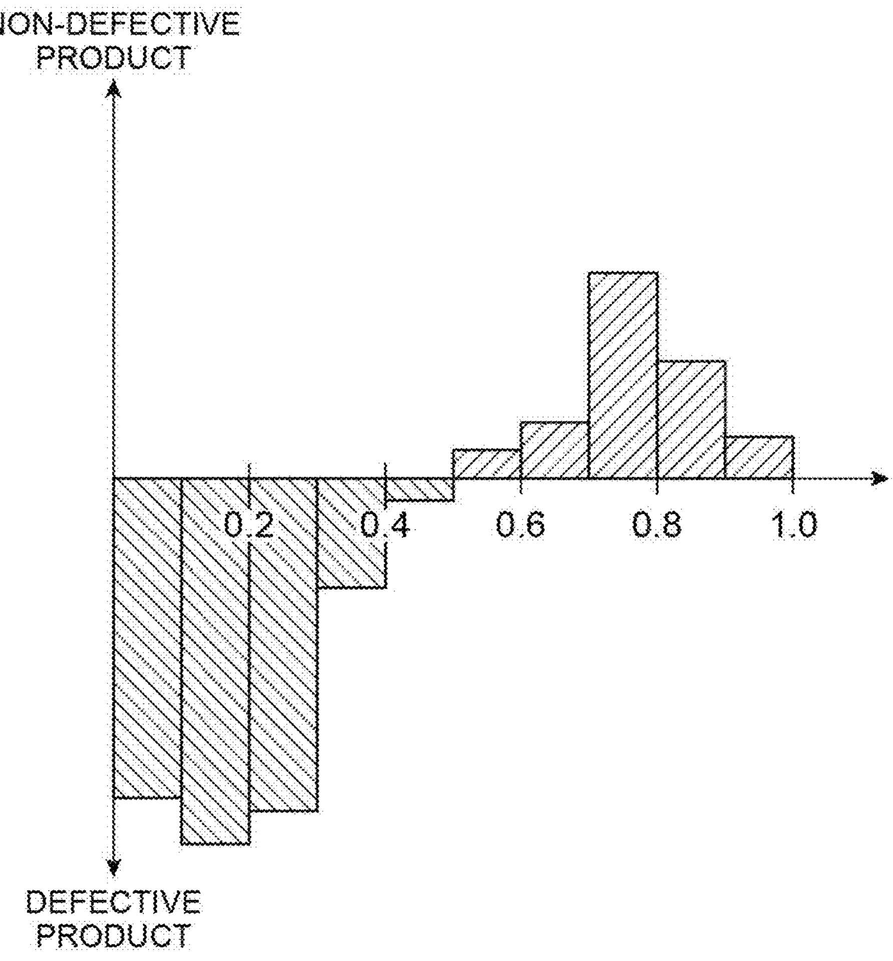
FIG. 7B is a diagram showing a relationship between an ROC curve and an AUC.

As illustrated in FIG. 6A, in a case where the distributions of the non-defective products and the defective products completely coincide with each other, that is, in a case where the quality classification is random, as illustrated in FIG. 6B, the ROC curve is a straight line having an inclination of 1 connecting the coordinates [0, 0] and the coordinates [1, 1]. In this case, the AUC represented by the area of the portion below the ROC curve is 0.5. On the other hand, as illustrated in FIG. 7A, in a case where the distributions of the non-defective products and the defective products are completely separated, that is, in a case where the quality can be completely classified, as illustrated in FIG. 7B, the ROC curve is a line linearly connecting the coordinates [0, 0] and the coordinates [0, 1] and linearly connecting the coordinates [0, 1] and the coordinates [1, 1]. In this case, the AUC represented by the area of the portion below the ROC curve is 1.0.

Figures 8A, 8B:
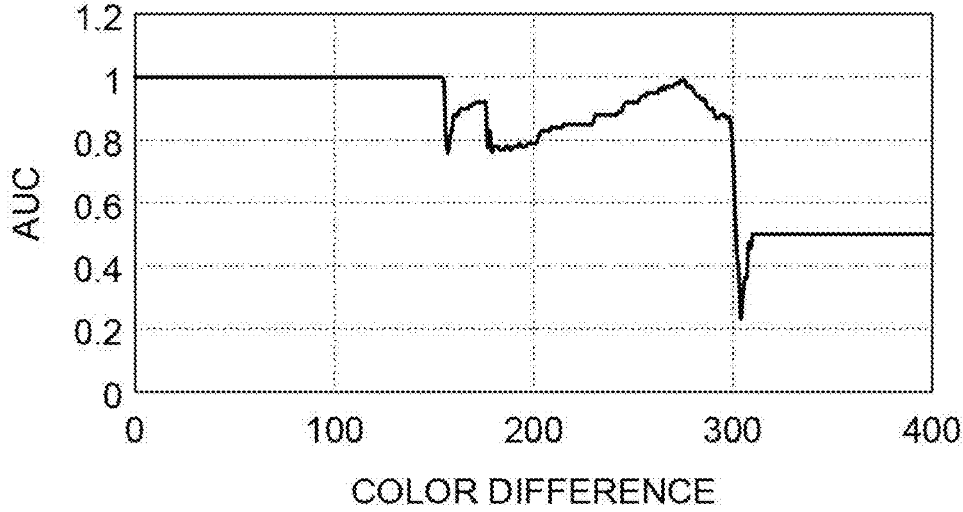
FIG. 8A is a diagram showing evaluation results of the AUC in an appearance inspection of an electronic component according to Example 1.
FIG. 8B is a diagram showing evaluation results of the AUC in the appearance inspection of the electronic component according to Example 1.

FIGS. 8A and 8B are a diagram showing evaluation results of the AUC in the appearance inspection of the electronic component according to Example 1. As shown in FIG. 8A, in Example 1, the color coordinate of the outer layer was light blue [200, 117, 115]. The color coordinates of the outer layer were calculated from the average value of the color coordinates at each extracted site after the color of the outer layer was randomly extracted at five locations. In this case, the color coordinate of the separation color having the largest color difference with respect to the color of the outer layer is brown [0, 255, 255].

In FIG. 8A, four colors of brown [0, 255, 255], reddish brown [58, 197, 197], dark brown [87, 168, 168], and gray [115, 140, 140] are extracted and shown as the colors of the inner layer. The color difference between the colors of these inner layers and the separation color is 0, 100, 150, and 200, respectively. In a case where the color difference was 0, 100, and 150, the AUC value was 1.00, whereas in a case where the color difference was 200, the AUC value was 0.79.

FIG. 8B is a diagram illustrating a calculation result of the AUC in the range in which the color difference between the color of the inner layer and the separation color is 0 or more and 400 or less, including the result in FIG. 8A. As illustrated in FIG. 8B, it can be seen that the value of the AUC is maintained at 1.00 in the range in which the color difference is 0 or more and 154 or less, whereas the value of the AUC rapidly decreases and varies in the range of about 0.1 to 0.7 in the range in which the color difference exceeds 154. From this result, by setting the color difference between the color of the inner layer and the separation color to within 150, preferably within 100, the value of the AUC in the appearance inspection becomes 1.00, and it can be confirmed that the quality determination based on the formation state of the pinhole can be accurately performed.

Figures 9A, 9B:
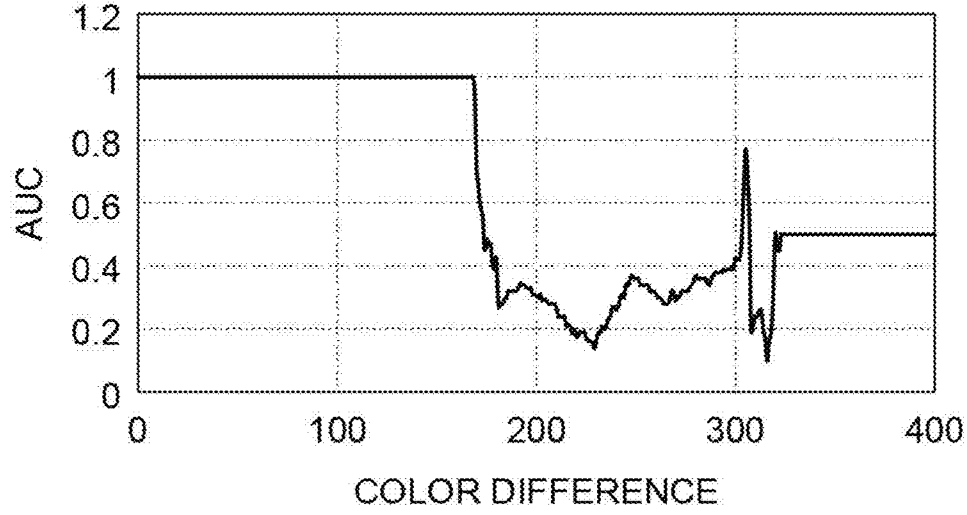
FIG. 9A is a diagram showing evaluation results of the AUC in an appearance inspection of an electronic component according to Example 2.
FIG. 9B is a diagram showing evaluation results of the AUC in the appearance inspection of the electronic component according to Example 2.

FIGS. 9A and 9B are a diagram showing evaluation results of AUC in the appearance inspection of the electronic component according to Example 2. As shown in FIG. 9A, in Example 2, the color coordinate of the outer layer was dark blue [92, 167, 52]. Similarly to Example 1, the color coordinates of the outer layer were calculated from the average value of the color coordinates at each extracted site after the color of the outer layer was randomly extracted at five locations. In this case, the color coordinate of the separation color having the largest color difference with respect to the color of the outer layer is bright green [255, 0, 255].

In FIG. 9A, four colors of bright green [255, 0, 255], green [197, 58, 197], deep green [168, 87, 168], and gray [140, 115, 140] are extracted and illustrated as the colors of the inner layer. The color difference between the colors of these inner layers and the separation color is 0, 100, 150, and 200, respectively. In a case where the color difference was 0, 100, 150, the AUC value was 1.00, whereas in a case where the color difference was 200, the AUC value was 0.31.

FIG. 9B is a diagram illustrating a calculation result of the AUC in the range in which the color difference between the color of the inner layer and the separation color is 0 or more and 400 or less, including the result in FIG. 9A. As illustrated in FIG. 9B, it can be seen that the value of the AUC is maintained at 1.00 in the range in which the color difference is 0 or more and 168 or less, whereas the value of the AUC rapidly decreases and varies in the range of about 0.1 to 0.8 in the range in which the color difference exceeds 168. From this result, similarly to Example 1, by setting the color difference between the color of the inner layer and the separation color to within 150, preferably within 100, the value of the AUC in the appearance inspection becomes 1.00, and it can be confirmed that the quality determination based on the formation state of the pinhole can be accurately performed.

As described above, in the electronic component 1, the exterior resin 5 includes the inner layer 11 and the outer layer 12, and the color of the inner layer 11 is defined on the basis of the separation color farthest from the color of the outer layer 12 in the L*a*b* color space S. In the electronic component 1, since there is a sufficient color difference between the outer layer 12 and the inner layer 11, the formation state of the pinhole P can be confirmed by counting the color away from the color of the outer layer 12 in the image processing. At this time, when the color difference of the color of the inner layer 11 with respect to the separation color is within 150, the AUC, which is an evaluation index related to binary classification, can be brought close to 1. Therefore, in the electronic component 1, the quality determination based on the formation state of the pinhole P can be accurately performed.

In the present embodiment, the color of the inner layer 11 is a color in which the color difference from the separation color is within 100. In this case, the AUC, which is an evaluation index related to the binary classification, can be brought closer to 1 more reliably. Therefore, the quality determination based on the formation state of the pinhole P can be performed more accurately.

The present embodiment includes a mode in which the color of the outer layer 12 is a color in which the color difference from the vertex color located at the vertex Kp of the L*a*b* color space S is within 50. Furthermore, the present embodiment includes a mode in which the color of the outer layer 12 is a color in which the color difference from the side color located at the side portion Kh of the L*a*b* color space S is within 50. According to such an aspect, the color difference between the color of the outer layer 12 and the separation color can be sufficiently secured, and as a result, the color difference between the outer layer 12 and the inner layer 11 can be easily secured. Therefore, the accuracy of the quality determination based on the formation state of the pinhole P can be further improved. Furthermore, the degree of freedom in selecting the resin material used for the inner layer 11 can be secured.

Figure 10A:
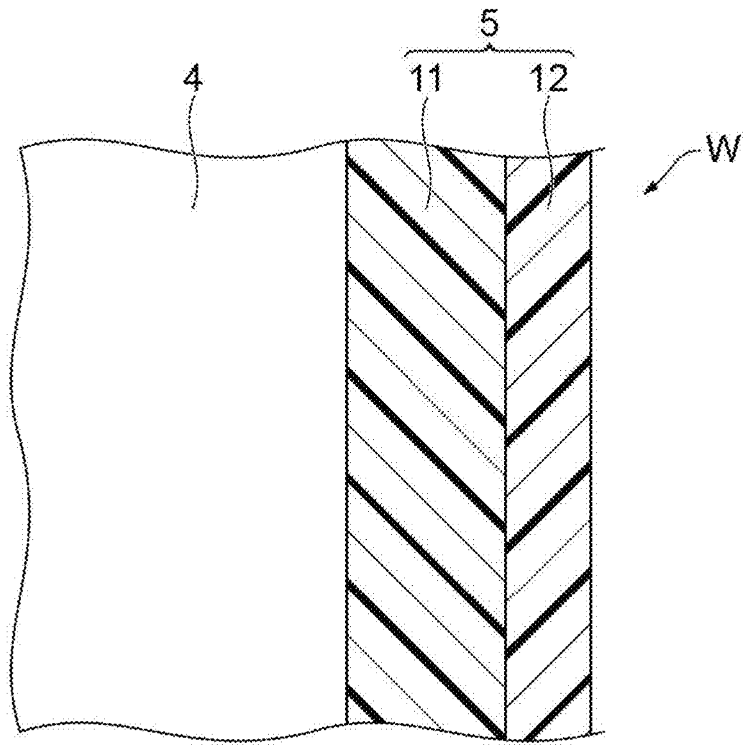
FIG. 10A is an enlarged schematic cross-sectional view illustrating a main part of an electronic component according to a modification.

The present disclosure is not limited to the above-described embodiment. For example, in the above embodiment, in the exterior resin 5, the thicknesses of the inner layer 11 and the outer layer 12 are uniform and equal to each other regardless of the site, but for example, as illustrated in FIG. 10A, in the exterior resin 5, at least in a portion W closer to the pair of lead terminals 4 and 4 than the ceramic body 2, the thickness of the inner layer 11 may be larger than the thickness of the outer layer 12.

The portion W closer to the pair of lead terminals 4 and 4 than the ceramic body 2 refers to a region from the lowest point of the peripheral surface 2*b* of the ceramic body 2 to the tip of a portion covering the base end portions of the lead terminals 4 and 4 (see FIGS. 1 and 2). That is, the portion W includes a portion from the lowest point of the peripheral surface 2*b* of the ceramic body 2 to the mounting surface R of the disk-shaped portion 5A of the exterior resin 5, and the pair of protruding portions 5B and 5B.

Figure 10B:
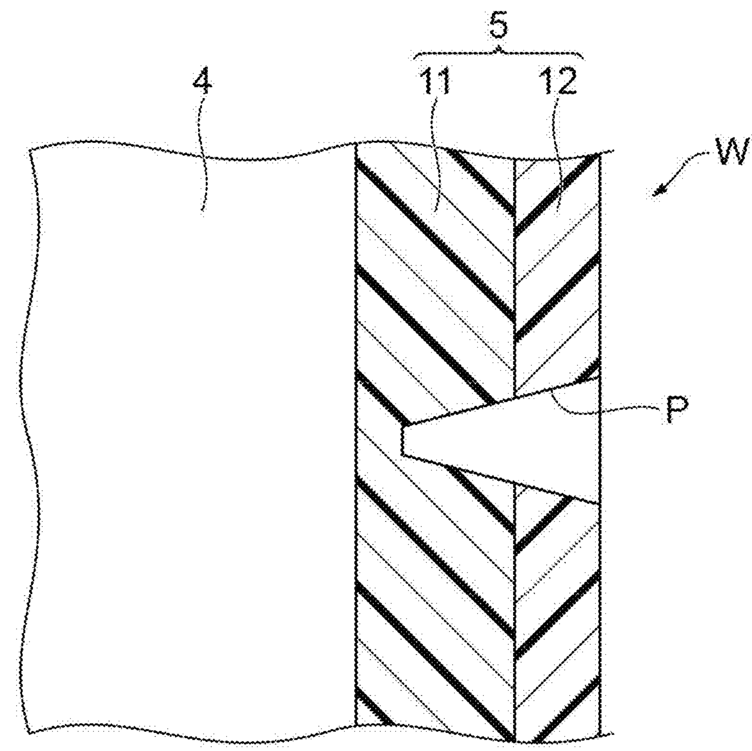
FIG. 10B is an enlarged schematic cross-sectional view illustrating a main part of the electronic component according to the modification.

In the exterior resin 5, the pinhole P tends to be more likely to occur in the portion W closer to the pair of lead terminals 4 and 4 than the ceramic body 2. By making the thickness of the inner layer 11 of the portion W larger than the thickness of the outer layer 12, the inner layer 11 is easily exposed from the outer layer 12 in the pinhole P having a depth reaching the lead terminal 4, for example, as illustrated in FIG. 10B, and the accuracy of the quality determination can be secured. This also applies to a case where pinholes P having a depth reaching the ceramic body 2 are formed.

Figure 11A:
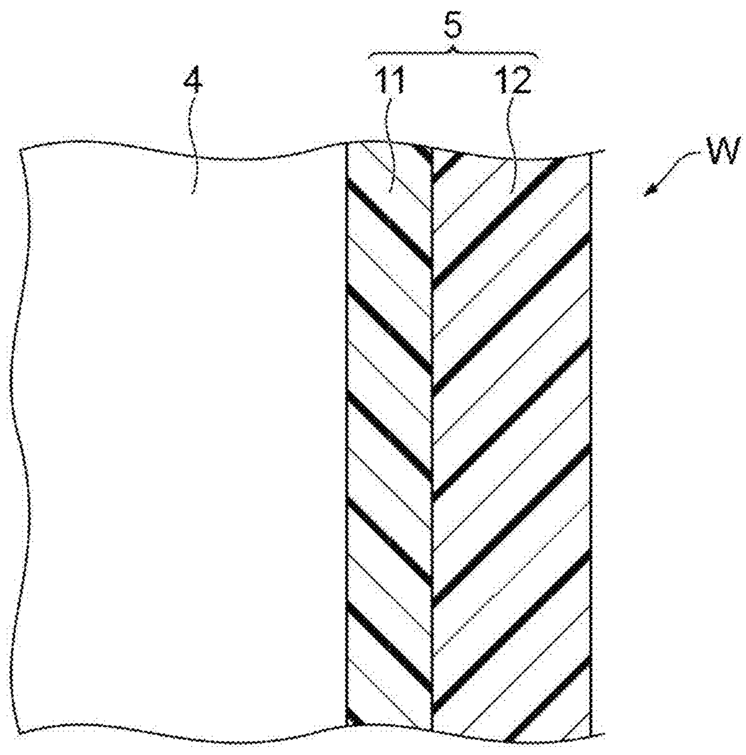
FIG. 11A is an enlarged schematic cross-sectional view illustrating a main part of an electronic component according to another modification.
Figure 11B:
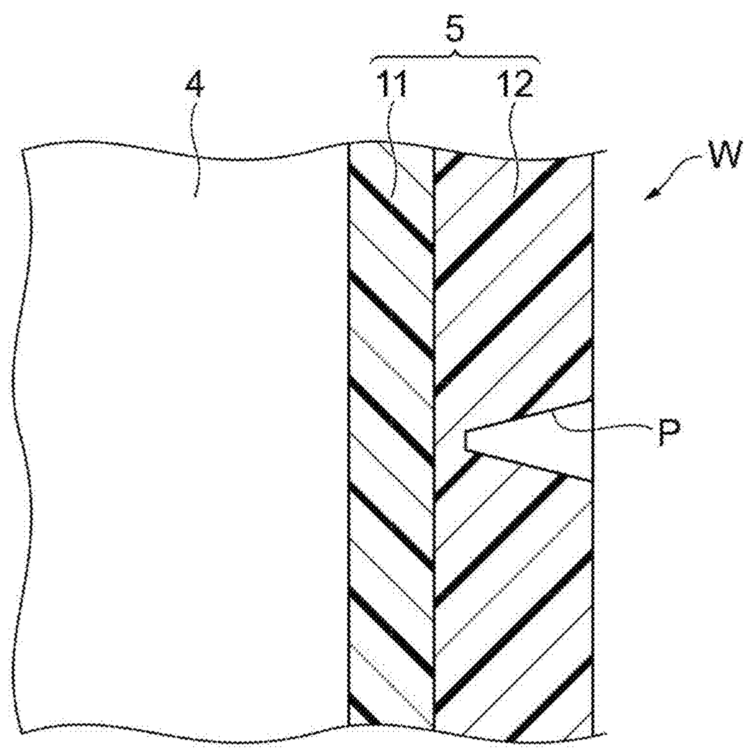
FIG. 11B is an enlarged schematic cross-sectional view illustrating a main part of the electronic component according to another modification.

Furthermore, for example, as illustrated in FIG. 11A, in the exterior resin 5, at least in the portion W closer to the pair of lead terminals 4 and 4 than the ceramic body 2, the thickness of the outer layer 12 may be larger than the thickness of the inner layer 11. In this case, as illustrated in FIG. 11B, in the pinhole P having a depth that does not reach the lead terminals 4 and 4 or the ceramic body 2, the inner layer 11 is less likely to be exposed from the outer layer 12, so that it is possible to suppress the determination that a non-defective product within the limit is a defective product.

In a case where the configurations as illustrated in FIGS. 10A and 11A are adopted, in the exterior resin 5, the thicknesses of the inner layer 11 and the outer layer 12 may have the above relationship at least only in the portion W closer to the pair of lead terminals 4 and 4 than the ceramic body 2, and the thicknesses of the inner layer 11 and the outer layer 12 may have the above relationship in the entire exterior resin 5 including the portion W. The thicknesses of the inner layer 11 and the outer layer 12 may have the above relationship in the portion W and a part of the portion excluding the portion W.

What is claimed is:

1. An electronic component comprising:

a ceramic body having a pair of principal surfaces;

a pair of electrode parts respectively provided on the pair of principal surfaces;

a pair of lead terminals electrically connected to the pair of electrode parts, respectively; and an exterior resin provided so as to cover the ceramic body, the pair of electrode parts, and base end portions of the pair of lead terminals, wherein the exterior resin has a two-layer structure including an inner layer and an outer layer having colors different from each other, and the color of the inner layer is a color having a color difference of within 150 from a separation color having a largest color difference with respect to the color of the outer layer in an L*a*b* color space each having a value of 0 to 255.

2. The electronic component according to claim 1, wherein the color of the inner layer is a color having a color difference of within 100 from the separation color.

3. The electronic component according to claim 1, wherein the color of the outer layer is a color having a color difference of within 50 from a vertex color located at a vertex of the L*a*b* color space.

4. The electronic component according to claim 1, wherein the color of the outer layer is a color having a color difference of within 50 from a side color located at a side portion of the L*a*b* color space.

5. The electronic component according to claim 1, wherein in the exterior resin, a thickness of the inner layer is larger than a thickness of the outer layer at least in a portion closer to the pair of lead terminals than the ceramic body.

6. The electronic component according to claim 1, wherein in the exterior resin, a thickness of the outer layer is larger than a thickness of the inner layer at least in a portion closer to the pair of lead terminals than the ceramic body.

* * * * *